United States Patent [19]

Sano et al.

[11] Patent Number: 4,849,390

[45] Date of Patent: Jul. 18, 1989

[54] CATALYSTS FOR POLYMERIZATION OF OLEFINS

[75] Inventors: Akira Sano, Kawasaki; Kunimichi Kubo; Kazuo Matsuura, both of Tokyo, all of Japan

[73] Assignee: Nippon Oil Co., Ltd., Japan

[21] Appl. No.: 38,949

[22] Filed: Apr. 16, 1987

[30] Foreign Application Priority Data

Apr. 23, 1986 [JP] Japan .................................. 61-94342

[51] Int. Cl.$^4$ ........................... C08F 4/64; C08F 4/68; C08F 4/02; C08F 10/00
[52] U.S. Cl. ..................................... 502/113; 502/119; 502/120; 502/125; 502/132; 502/134; 526/129
[58] Field of Search ............... 502/115, 113, 105, 103, 502/8, 9, 10, 119, 120, 125, 132, 133, 134; 526/129

[56] References Cited

U.S. PATENT DOCUMENTS

| | | | |
|---|---|---|---|
| 4,315,999 | 2/1982 | Matsuura et al. | 526/114 |
| 4,379,759 | 4/1983 | Goeke et al. | 252/429 B |
| 4,396,534 | 8/1983 | Matsuura et al. | 526/125 |
| 4,434,083 | 2/1984 | Van De Leempvt et al. | 526/129 |
| 4,540,757 | 9/1985 | McDaniel | 502/105 |
| 4,550,093 | 10/1985 | Fanelli et al. | 502/113 |
| 4,560,733 | 12/1985 | Martin et al. | 502/105 |
| 4,593,009 | 6/1986 | Nowlin | 502/113 |
| 4,647,550 | 3/1987 | Kohora et al. | 502/115 |
| 4,670,413 | 6/1987 | Fortek | 502/115 |

FOREIGN PATENT DOCUMENTS 1053332 12/1966 United Kingdom .
1484254 9/1977 United Kingdom ................ 502/115

Primary Examiner—Paul E. Konopka
Attorney, Agent, or Firm—Finnegan, Henderson, Farabow, Garrett & Dunner

[57] ABSTRACT

A catalyst for polymerization of olefins is disclosed which comprises a titanium and/or vanadium compound supported on a silicon and/or aluminum oxide carrier. This carrier has peculiar characteristics including a specified proportion of highly spherical oxide particles, a selected average pore size and a specified proportion of a selected particle size range before and after ultrasonic treatment, whereby there is obtained a catalyst having increased bulk density, narrow particle size distribution and high fluidity.

2 Claims, No Drawings

CATALYSTS FOR POLYMERIZATION OF OLEFINS

BACKGROUND OF THE INVENTION

1. Field of the Invention

This invention relates to catalysts useful for the homopolymerization or copolymerization of α-olefins of 2–12 carbon atoms.

2. Prior Art

A variety of catalysts have been proposed for use in the production of polyolefins, typical examples of such catalysts being those having transition metal compounds such as titanium or vanadium supported on solid compounds such as magnesium halide, magnesium oxide, magnesium hydroxide and other inorganic magnesium compounds. These conventional catalysts had a drawback in that the polymer produced therewith is relatively small in both bulk density and average particle size and predominant in objectionably minute granules. Such prior catalysts were further responsible for the development of dusts during the molding of the polymer and hence for reduced efficiency of polymer processing.

There are known certain other types of catalysts are disclosed for example in Japanese Patent Publication No. 43-2211, Japanese Laid-Open Patent Publication Nos. 54-148093, 56-47407 and 58-21405, which catalysts comprise titanium or vanadium and/or inorganic magnesium solids supported on particulate carriers of $SiO_2$ or $Al_2O_3$. These catalysts are reportedly capable of providing polymers with increased bulk density and greater average particle size, but need further improvement before such polymers can be readily put into molding or other processing apparatus without being first pelletized.

SUMMARY OF THE INVENTION

It is therefore the primary object of the present invention to provide improved catalysts capable of producing polymers which are characterized by high bulk density, large average particle size, narrow particle size distribution, objectionably micro-sized granules reduced to an absolute minimum, high sphericity and fluidity. These characteristics lead to increased productivity and ease of polymer handling.

It has now been found that the above and related objects can be achieved by the provision of a catalyst for polymerization of olefins which comprises a titanium and/or vanadium compound supported on a silicon and/or aluminum oxide carrier, characterized in that said carrier has:

(i) more than 90% of a particle size distribution represented by a sphericity value of 0.75–1.0 of the equation $$4A/\pi L^2$$

where A is a projected surface area of and L is an absolute maximum length of said silicon and/or aluminum oxide, (ii) an average pore size of 180 Å–250 Å in diameter, (iii) more than 60% of a pore size portion in the range of 100 Å–300 Å in diameter, and (iv) more than 50% of a particle size portion in the range of 50 μm–150 μm in diameter after exposure to ultrasonic waves of 28 KHz and 200 W for two hours.

DETAILED DESCRIPTION OF THE INVENTION

The catalysts contemplated by the invention are suitable particularly for use in the production of polyolefins.

The term silicon oxide as used herein includes silica and double oxides of silicon and at least one of the metals of Group I–VIII of the Periodic Table.

The term aluminum oxide as used herein includes alumina and double oxide of aluminum and at least one of the metals of Group I–VIII of the Periodic Table.

Typical examples of the above double oxides which serve as the carrier of transition metal compounds are $Al_2O_3.MgO$, $Al_2O_3.CaO$, $Al_2O_3.SiO_2$, $Al_2O_3.MgO.CaO$, $Al_2O_3.MgO$ $SiO_2$, $Al_2O_3.CuO$, $Al_2O_3.Fe_2O_3$, $Al_2O_3.NiO$ and $SiO_2.MgO$. These are not molecular formulae but are representative only of composition. The double oxides according to the invention are not restricted to any specific structure or component ratios. The invention does not preclude the presence of small quantities of water or impurities in the silicon and/or aluminum oxides hereinafter referred to as metal oxides.

According to an important aspect of the invention, whatever metal oxide is chosen, it is in the form of highly spherical granules. The sphericality of the metal oxide particles or granules is determined by the procedure in which sampled oxide granules are dispersed without being superposed one upon another, optimicroscopically magnified 50 times and image-analyzed to obtain a surface area of projection (A) of and an absolute maximum length (L) of each individual granule. The ratio of (A) to corresponding surface area (A') based on a circle assumed to be true from the measured (A) and (L) represents a sphericality within the meaning of the invention, thus:

$$\text{Sphericality} = A/A' = 4A/\pi L^2$$

Sphericality values eligible for the purpose of the invention range from 0.75 to 1.0, the granules within which range being referred to hereafter as "truly spherical granules". Each sampling should contain preferably 90% or greater of such truly spherical granules. More preferably, the same percentage should contain granules of a sphericality in the range of 0.8–1.0 to obtain best results. It has been found that catalysts containing more than 10% of metal oxide granules of a sphericality of less than 0.75 and hence predominantly untruly spherical granules would result in the formation of polymers, though relatively large in average particle size, which are poorly fluid and difficult in handling on molding.

According to another important aspect of the invention, the metal oxide has an average pore size of 180 Å–250 Å in diameter and contains preferably more than 60%, more preferably greater than 80% of a pore size portion in the range of 100 Å–300 Å in diameter. Departures from this spectrum of pore size distribution would lead to various adverse effects. Metal oxide carriers predominant in granules of less than 100 Å in pore size and having an average pore size of less than 180 Å would provide polymers with hollow granules and hence extemely low bulk density. This is not clearly accountable but is believed due to the titanium and/or vanadium compound being supported unstably on the outer surface, not effectively within the pores of the carrier.

Metal oxide carriers predominant in granules exceeding 300 Å in pore size and 250 Å in average pore size would result in polymers too minute in particle size, not spherical and not fluid. The reason for this is not clearly known but believably because the carrier being too large in pore size tends to grow mechanically weak and rupture during the course of the polymerization reaction.

According to a further important aspect of the invention, the metal oxide carrier contain more than 50%, preferably 50-95%, of granules ranging in particle size between 50 μm-150 μm in diameter after exposure of granules of the same particle size range to ultrasonic waves of 28 KHz and 200 W for two consecutive hours. Less than 50% of granules of such breaking strength against ultrasonic waves would result in polymers susceptible to excessive reduction in particle size.

The breaking strength of the metal oxide carriers against ultrasonic waves may be measured by the procedure in which 10 mg of the carrier are placed in a 200 ml tapped Erlenmeyer flask, followed by addition of 100 ml of deionizer water, and the flask is then placed in 7.5 liters of water in a ultrasonic wave generator (28 KHz, 200 W). This ultrasonic treatment is continued for two hours, whereupon a droplet of the treated dispersion is magnified 50 times under optical mircroscope and the thus magnified image is analyzed by an image analyzer to obtain a particle size distribution. The carrier should have a specific surface area of more than 50 $m^2/g$ and a porosity of more than 0.5 $cm^3/g$ to ensure effective deposit of a selected transition metal compound in the micropores of the carrier.

The catalyst component thus obtained should have an average particle size (weight average) of larger than 40 μm, preferably 50 μm in diameter.

Metal oxides used in the invention may widely vary anywhere between 20 μm and 200 μm, preferably between 40 μm and 150 μm in diameter.

Such metal oxides may be synthesized by many different methods. For example, to a slurry of slica gel having 1-60 wt.% of $SiO_2$ may be added a silicic acid solution as a binder at a rate of 1/1000 or less of $SiO_2$ per minute together with an alkaline solution while the slurry is maintained at 50°-100° C. and at pH of greater than 8.5, and the admixture is then dried and calcined.

The titanium and/or vanadium compound includes halides, alkoxyhalides, alkoxides and halogen oxides of titanium and/or vanadium. Trivalent and tetravalent titanium compounds are preferred as the titanium compound used in accordance with the invention.

The tetravalent titanium compound may be represented by the formula $Ti(OR)_nX_{4-n}$ (where R is an alkyl, aryl or aralkyl group of 1-20 carbon atoms, X is a halogen atom, and n is $0 \leq n \leq 4$.), typical examples of which include titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium and tetraphenoxytitanium.

Typical examples of the trivalent titanium compound are titaniums trihalides resulting from reducing titanium tetrahalides such as titanium tetrachloride and titanium tetrabromide with hydrogen, aluminum, titanium or an organometallic compound of a metal of Groups I-III of the Periodic Table, and a trivalent titanium compound resulting from reducing a titanium alkoxyhalide of the formula $Ti(OR)_mX_{4-m}$ (where R is an alkyl, aryl or aralkyl group of 1-20 carbon atoms, X is a halogen atom, and m is $0 < m < 4$.) with an organometallic compound of a metal of Groups I-II of the Periodic Table.

The vanadium compound includes a trivalent vanadium compound such as vanadium trichloride and vanadium triethoxide, a tetravalent vanadium compound such as vanadium tetrachloride, vanadium tetrabromide, vanadium tetraiodide and tetraethoxyvanadium, and a pentavalent vanadium compound such as oxytrichlorovanadium, ethoxydichlorovanadyl, triethoxyvanadyl and tributoxyvanadyl.

To obtain more effective results, both titanium and vanadium compounds may be used in combination, in which instance the molar ratio of vanadium/titanium is preferably in the range of 2/1-0.01/1.

Upon the metal oxide carrier may be deposited the above-mentioned transition metal compounds alone or in combination with magnesium compounds such as metal magnesium, magnesium hydroxide, magnesium carbonate, magnesium oxide, magnesium fluoride, magnesium chloride, magnesium bromide, magnesium iodide, or double salts, double oxides, carbonates, chlorides or hydroxides which contain magnesium atoms and a metal chosen from silicon, aluminum and calcium, or any of these inorganic solid compounds treated or reacted with oxygen-containing compounds, sulfur-containing compounds, aromatic hydrocarbons, or halogen-containing materials. There may be further blending with one or more of compounds of the formula

$$R_mMe(OR')_nX_{z-(m+n)}$$

where Me is an element of Groups I-IV of the Periodic Table; z is a valence of Me; m is common to R and X and $0 \leq m \leq z$; n is $0 \leq n \leq z$; $m+n$ is $0 \leq m+n \leq z$; X is a halogen atom and R and R' each are a hydrocarbon moiety such as an alkyl, aryl and aralkyl group of 1-20 carbon atoms, preferably 1-8 carbon atoms and may be identical or different. Specific examples include $Mg(OC_2H_5)_2$, $Mg(OC_2H_5)Cl$, $B(OC_2H_5)_3$, $Al(OCH_3)_3$, $Al(OC_2H_5)_3$, $Al(On-C_3H_7)_3$, $Al(Oi-C_3H_7)_3$, $Al(On-C_4H_9)_3$, $Al(Osec-C_4H_9)_3$, $Al(Ot-C_4H_9)_3$, $Al(OC_6H_5)_3$, $Al(OC_8H_{17})_3$, $Al(OCH_3)_2Cl$, $Al(OC_2H_5)_2Cl$, $Al(OC_2H_5)Cl_2$, $Al(Oi-C_3H_7)_2Cl$, $Al(Oi-C_3H_7)Cl_2$, $Si(OC_2H_5)_4$, $Si(OC_2H_5)_3Cl$, $Si(OC_2H_5)_2Cl_2$, $Si(OC_2H_5)Cl_3$, $SiCl_4$, $CH_3SiCl_3$, $(CH_3)_2SiCl_2$, $C_2H_5SiCl_3$, $n-C_4H_9SiCl_3$, $C_8H_{17}SiCl_3$, $C_{18}H_{37}SiCl_3$, $C_6H_5SiCl_3$ and $(C_6H_5)_2SiCl_2$. These compounds may be contacted for example by the procedure in which they are heated and stirred in an organic solvent such as an inert hydrocarbon, alcohol, ether, ketone or ester at 50° C.-200° C. for 5 minutes to 24 hours and thereafter stripped of the solvent.

The organometallic compound contemplated by the present invention may be those of Groups I to IV metals of the Periodic Table which are known as one component of the Ziegler catalysts and preferably includes organoaluminum compounds and organozinc compounds. Examples of these organometallic compounds are organoaluminum compounds represented by the general formula $R_3Al$, $R_2AlX$, $RAlX_2$, $R_2AlOR$, $RAl(OR)X$, and $R_3Al_2X_3$ (where R is an alkyl or aryl group of 1 to 20 carbon atoms, which may be the same or different, and X is a halogen atom), and organozinc compounds represented by the general formula $R_2Zn$ (where R is an alkyl group of 1 to 20 carbon atoms, which may be either identical or different). Typical examples of these compounds include triethylaluminum, triisopropylaluminum, triisobutylaluminum, tri-sec-butylaluminum, tri-tert-butylaluminum, trihexylaluminum, trioctylaluminum, diethylaluminumchloride, diisopropylaluminumchloride, diethylaluminumethoxide, ethylaluminumsesquichloride, diethylzinc and mixtures thereof. The organometallic compounds may usually be used in amounts of from 0.1 to 1,000 mols with respect to the transition metal compound.

Polymerization of olefins with use of the catalysts of the invention may be in slurry or gas-phase, although the latter polymerization is preferred, and may be most suitably effected to produce polyethylenes of a ultra-low density ranging between 0.86–0.92, preferably between 0.88–0.91, in a manner similar to polymerization of olefins by common Ziegler catalysts; that is, in a substantially oxygen-free, water-free condition and in the presence or absence of an inert hydrocarbon. Polymerization conditions for olefins involve a temperature ranging from 20° to 120° C., preferably 40° to 100° C., and a pressure from atmospheric to 70 kg/cm$^2$, preferably 2 to 60 kg/cm$^2$. The molecular weight can be controlled to some extent by changing the polymerization temperature or the catalyst mol ratio, but can be more effectively controlled by addition of hydrogen to the polymerization system. There can be considered, with use of the catalyst of the invention, multi-stage polymerization reactions involving different hydrogen concentrations, different temperatures and other different reaction conditions.

The process of the invention is applicable to the polymerization of all olefins that are polymerizable with Ziegler-type catalysts. For example, it is suitable for homopolymerization of α-olefins such as ethylene, propylene, butene-1, and hexene-1 and 4-methylpentene-1, and copolymerization of ethylene/propylene, ethylene/butene-1, ethylene/hexane-1 and propylene/butene-1. Copolymerization with dienes is also applicable for modification of polyolefins, such dienes being for example butadiene, 1,4-hexadiene, ethylidennorbornene and dicyclopentadiene.

The following examples are given to further illustrate the present invention, but it is to be understood that the invention is not limited thereto.

Inventive Example 1

(a) Preparation of Catalyst 10 grams of anhydrous magnesium chloride, 4.2 grams of aluminum-triethoxide were placed in a stainless steel pot of 400 ml capacity containing 25 stainless steel balls each ½ inch in diameter, and subjected to milling for 16 hours at room temperature in a nitrogen atmosphere. 5 grams of the resulting reaction product and 5 grams of SiO$_2$ (hereafter referred to as "Test Component A") calcined at 600° C. were charged into nitrogen-purged three-necked flask equipped with stirrer and reflux condenser. This Test Component A had 98% of 0.75–1.0 sphericality portion; 92% of 0.80–1.0 sphericality portion; an average pore size of 190 Å, 82% of 100 Å–300 Å pore size portion (3% of less than 100 Å portion and 15% of more than 300 Å portion); particle size range of 44 μm–149 μm; and 38% (by counted numbers) of 10 μm–50 μm pore size portion and 62% (by counted numbers) of 50 μm–150 μm pore size portion after ultrasonic treatment.

Reaction was continued with addition of 100 ml of tetrahydrofuran at 60° C. for 2 hours and thereafter the reaction mixture was vacuum-dried at 120° C. to remove this additive. 3 ml silicon tetrachloride was added, and reaction was resumed at 60° C. for about 2 hours and continued with addition of 1.6 ml titanium tetrachloride at 130° C. for still another 2 hours to give a catalyst which contained 40 mg titanium per gram catalyst.

(b) Gas-phase Polymerization

A stainless steel autoclave was used in a loop formed with a blower, a flow controller and a dry cyclone. Temperature of the autoclave was adjusted with a flow of warm water through its jacket. The autoclave temperature-adjusted at 60° C. was charged with the above catalyst at a rate of 250 mg/hr and triethylaluminum at a rate of 50 mmol/hr. Butene-1/ethylene was added at controlled molar ratio of 0.35 and hydrogen was also supplied at controlled rate of 10% of the total pressure. Polymerization was effected with the system gases circulated by the blower. The resulting ethylene copolymer had a bulk density of 0.47, a melt index of 1.2 and a density of 0.922. It was a particulate product having an average particle size of 990 μm without granules less than 177 μm and a substantially spherical shape. Catalytic activity was as high as 150,000 grams of copolymer per gram titanium.

After 1,000 hours of continuous run, the autoclave was opened for inspection, whereupon it was found clean with no polymer deposit on its inner wall nor any cloddy material.

(c) Fluidity Test 100 ml particulate polymer was slowly placed in a bulk density tester (JIS K-6721) in a manner similar to ordinary bulk density measurement. The tester was held open at the bottom to let the polymer fall out spontaneously. The length of time consumed for all of 100 ml polymer granules to depart from the tester was measured, which was only 14 seconds with the polymer obtained in this exmaple.

Comparative Example 1

The procedures of Inventive Example 1(a) and Inventive Example 1(b) were followed except for the use of control SiO$_2$ tradenamed Ketjen F7 of Akzo Chemie in place of Test Component A SiO$_2$. The properties of control SiO$_2$ and the results of polymerization are shown in Table 1.

Comparative Example 2

The procedures of Inventive Example 1(a) and Inventive Example 1(b) were followed except for the use of control SiO$_2$ tradenamed Microbeads Silicagel Grade 4B of Fuji-Davison in place of Test Component A SiO$_2$. The properties of control SiO$_2$ and the results of polymerization are shown in Table 1.

Comparative Example 3

The procedures of Inventive Example 1(a) and Inventive Example 1(b) were followed except for the use of Test Component B, which was SiO$_2$ of extremely low breaking strength, in place of Test Component A. The properties of Test Component B and the results of polymerization are shown in Table 1.

TABLE 1

| Example | SiO₂ | SiO₂ Properties - Sphericality of 0.75 1.0 % | SiO₂ Properties - Average Pore Size Å | SiO₂ Properties - 100 Å~300 Å Pore Size % | SiO₂ Properties - 50 μm~150 μm Particle Size % after ultrasonic treat. | Results of Polymerization - Operation hr. | Results of Polymerization - Catalytic Activity gPE/gTe | Results of Polymerization - Bulk Density g/ml | Results of Polymerization - MI g/10 min. | Results of Polymerization - Density g/ml | Results of Polymerization - Average Polymer Particle Size μm | Results of Polymerization - Less than 177 μm % | Results of Polymerization - Fluidity Test sec. | Autoclave condition |
|---|---|---|---|---|---|---|---|---|---|---|---|---|---|---|
| Inventive Example 1 | Test Component A | 98 | 190 | 82 | 62 | 1000 | 1.5 × 10⁵ | 0.47 | 1.2 | 0.922 | 990 | 0 | 14 | no clods, no deposits |
| Comparative Example 1 | Ketjen F7 | 51 | 238 | 75 | 49 | 200* | 1.3 × 10⁵ | 0.28 | 1.1 | 0.923 | 840 | 5 | 23 | deposits |
| Comparative Example 2 | Microbeads Silicagel Grade 4B | 100 | 53 | 24 | 84 | 150* | 2.1 × 10⁴ | 0.22 | 0.9 | 0.925 | 720 | 12 | 26 | clods & deposits |
| Comparative Example 3 | Test Component B | 96 | 500 | 36 | 0 | 150* | 1.9 × 10⁵ | 0.25 | 1.4 | 0.922 | 220 | 41 | 35 | clods & deposits |

*maximum operability hours

Inventive Example 2

A 2-liter stainless steel autoclave equipped with an induction stirrer was purged with nitrogen and charged with 1,000 ml of hexane, 1 mmol of triethylaluminum, and 80 mg of the catalyst of Inventive Example 1(a). Temperature was raised to 85° C. with stirring. The system was pressurized to 1.7 kg/cm² G with the hexane vapor pressure, and hydrogen was charged up to a total pressure of 6 kg/cm² G and further up to a total pressure of 10 kg/cm² G by continuous charge of ethylene. Polymerization was initiated and maintained at that total pressure for 1.5 hours. Upon completion of polymerization, polymer slurry was taken into a beaker and hexane was removed. There was obtained 230 g of a white polyethylene having a melt index of 13.9 and a bulk density of 0.37. Catalytic activity was represented by 144,000 g polyethylene/g.Ti. The resulting particulate polymer had an average particle size of 1,300 μm and less than 1% of 177 μm or smaller size portion, and was substantially spherical. Fluidity test as per Inventive Example 1(c) indicated 16 seconds, meaning high fluidity.

Comparative Example 4

The procedure of Inventive Example 2 was followed to effect slurry polymerization with use of the catalyst of Comparative Example 1. There was obtained 175 g a white polyethylene having a melt index of 10.4 and a bulk density of 0.29, with catalytic activity of 110,000 g.polyethylene/g.Ti. The polymer was irregular in shape and took 28 seconds in fluidity test.

Inventive Example 3

The procedures of Inventive Example 1(a) and Inventive Example 1(b) were followed except that the butene-1/ethylene molar ratio in the autoclave gas phase was changed to 0.60 and hydrogen charge was 5% of the total pressure. There was obtained a particulate polyethylene having a melt index of 1.2, a bulk density of 0.8900 and an average particle size of 1,160 μm without 177 μm or smaller size portion. It was substantially spherical and highly fluid as fluidity test results were 17 seconds.

Inventive Example 4

(a) Preparation of Catalyst 10 grams Test Component (SiO₂) used in Inventive Example 1 was placed in a 500 ml three-necked flask and vacuum-dried at 150° C. for 12 hours. 30 ml titanium tetrachloride and 200 ml isooctane were added, and reaction was continued for 2 hours under isooctane reflux. Thereafter, the solution was removed by decantation, and the flask was washed with isooctane until free titanium was nearly nil. The resulting catalyst contained 5.5 mg titanium per gram catalyst.

(b) Slurry Polymerization

A 2-liter stainless steel autoclave equipped with an induction stirrer was purged with nitrogen and charged with 1,000 ml of hexane, 3 mmol of triethylaluminum, and 500 mg of the above catalyst. Temperature was raised to 85° C. with stirring. The system was pressurized to 1.7 kg/cm² G with the hexane vapor pressure, a hydrogen was charged up to a total pressure of 6 kg/cm² G and further up to a total pressure of 10 kg/cm² G by continuous charge of ethylene. Polymerization was initiated and maintained at that total pressure for 4 hours. Upon completion of polymerization, polymer slurry was taken into a beaker and hexane was removed. There was obtained 35 g of a polyethylene having a melt index of 1.1 and a bulk density of 0.41. Fluidity test as per Inventive Example 1(c) indicated 15 seconds.

Inventive Example 5

The procedure of Inventive Example 1(a) was followed except for the use of 0.6 g VO(OC₂H₅)₃ and 2.1 g titanium tetrachloride in place of 1.6 ml titanium tetrachloride. Polymerization was carried out continuously for 500 hours pursuant to the procedure of Inventive Example 1(b). There was obtained a particulate polymer having a melt index of 1.8, a bulk density of 0.42, a density of 0.919 and an average particle size of 900 μm without less than 177 μm. It was substantially spherical and took 15 seconds by fluidity test. Catalytic activity was 140,000 g.polyethylene/g.(Ti+V).

Inventive Example 6

The procedure of Inventive Example 1(a) was followed except for the use of Test Component C ($SiO_2/Al_2O_3$) in place of Test Component A ($SiO_2$). Test Component C is identified in Table 2. Polymerization was continued for 500 hours according to the procedure of Inventive Example 1(b). There was obtained a particulate polymer of high sphericity having a melt index of 0.6, bulk density of 0.44, a density of 0.923 and an average particle size of 910 μm without les than 177 μm. Fluidity test showed 17 seconds. Catalytic activity was 80,000 g.polyethylene/g.Ti.

TABLE 2

| | Sphericality of 0.75 1.0 % | Average Pore Size Å | 100 Å 300 Å Pore Size % | 50 μm~150 μm Particle Size % after ultrasonic treat. |
|---|---|---|---|---|
| Test Component C | 94 | 220 | 65 | 70 |

What is claimed is:

1. A catalyst for polymerization of olefins which comprises a titanium and/or vanadium compound supported on spherical granules of a silicon oxide carrier, characterized in that said carrier has:
   (i) more than 90% of a particle size distribution represented by a sphericality value of 0.75–1.0 of the equation $4A/\pi L^2$ where A is the projected surface area of and L is the maximum length of an optical projection of each individual granule,
   (ii) an average pore size of 180 Å–250 Å in diameter,
   (iii) more than 60% of a pore size portion in the range of 100 Å–300 Å in diameter, and
   (iv) more than 50% of a particle size portion in the range of 50 μm–150 μm in diameter after exposure to ultrasonic waves of 28 HKz and 200 W for two hours.

2. A catalyst for polymerization of olefins which comprises a titantium and/or vanadium compound supported on spherical granules of a silicon oxide carrier, characterized in that said carrier has:
   (i) more than 90% of a particle size distribution represented by a sphericality value of 0.75–1.0 of the equation $4A/\pi L^2$ where A is the projected surface area of and L is the maximum length of an optical projection of each individual granule,
   (ii) an average pore size of 180 Å–250 Å in diameter,
   (iii) more than 60% of a pore size portion in the range of 100 Å–300 Å in diameter, and
   (iv) more than 50% of a particle size portion in the range of 50 μm–150 μm in diameter after exposure to ultrasonic waves of 28 HKz and 200 W for two hours, said catalyst being capable, when used in the polymerization of olefins, of producing polymers characterized by high bulk density, large distribution, high sphericality and fluidity.

* * * * *